United States Patent [19]

Proper

[11] Patent Number: 5,285,805
[45] Date of Patent: Feb. 15, 1994

[54] STRETCH VALVE METHOD AND APPARATUS

[75] Inventor: George N. Proper, Milpitas, Calif.

[73] Assignee: General Valve Corporation, Fairfield, N.J.

[21] Appl. No.: 34,120

[22] Filed: Mar. 22, 1993

[51] Int. Cl.5 .............................................. F16K 7/20
[52] U.S. Cl. ...................................... 137/1; 137/903; 251/321; 251/902
[58] Field of Search ................. 137/903; 251/320, 321, 251/902

[56] References Cited

U.S. PATENT DOCUMENTS

| | | | |
|---|---|---|---|
| 612,570 | 10/1898 | Pickett | 137/903 X |
| 1,860,888 | 5/1932 | Crowley | 137/903 X |
| 2,095,770 | 10/1937 | Sorenson | 277/20 |
| 2,888,034 | 5/1959 | Clegg | 137/512.4 |
| 3,058,431 | 10/1962 | Eddy | 103/227 |
| 3,184,216 | 5/1965 | Lovell | 251/321 X |
| 3,548,878 | 12/1970 | Brigandi | 137/636.1 |
| 3,584,834 | 6/1971 | Reid et al. | 251/321 |
| 4,135,699 | 1/1979 | Petzsch et al. | 251/320 |
| 4,275,765 | 6/1981 | Dugas | 137/625.48 |
| 4,326,541 | 4/1982 | Eckels | 251/321 X |

*Primary Examiner*—Stephen M. Hepperle
*Attorney, Agent, or Firm*—Thomas M. Champagne

[57] ABSTRACT

A stretch valve which achieves precise control of fluid flow rates through the use of a cylindrical elastomeric valve element. This elastomer element is installed within the cylindrical flow path of a valve body. The flow path has a diameter that is slightly smaller than that of the elastomer element, which is therefore constrained within the flow path. Longitudinal stretching of the elastomer element causes the diameter of the elastomer element to decrease. As a result, a flow path is opened. The further the elastomer element is stretched, the larger is the fluid path that is created. Therefore, precise control of the fluid flow rate is made possible.

13 Claims, 3 Drawing Sheets

STRETCH VALVE METHOD AND APPARATUS

BACKGROUND OF THE INVENTION

I. Field of the Invention

The present invention relates generally to a valve for controlling the passage of fluids. In particular, the present invention relates to an elastomer body which is installed in a main valve body and which can be stretched to control the fluid flow between two points.

II. Background and Description of Related Art

In biochemistry and biotechnology research, the precise metering of fluids is critical to the success or failure of experiments and/or the production of bioengineered products. Many existing valve designs are simply inappropriate for such use. Valves which are suited for such use, however, are those having designs which use elastomeric components, because of their resilient spring qualities. Elastomeric elements are especially well suited for the design of valves which are to be used to precisely control the flow rate of a fluid or to dispense a precise volume of fluid. Some valves, however, are designed to merely open or close an opening, without regard to the flow rate or output volume of fluid allowed by the valve. Such designs do not take into account precision fluid flow control. For example, U.S. Pat. No. 3,584,834 to Reid et al. discloses a valve assembly that features a rubber element that acts as both a stopper for the valve and as a spring. When a button is depressed, the stopper moves and the valve opens. When pressure on the button is released, the spring properties of the rubber element draw the stopper back into place. The stopper valve design is not directed to the precision control of fluid flow.

Other valves are designed to select among influents to be passed to an output port. For example, U.S. Pat. No. 4,275,765 to Dugas discloses a valve assembly utilizing an elastomeric member that is designed to enable a fast flush of body fluids from either of two catheters to a pressure transducer. The elastomer member has a cylindrical cavity into which a plunger is inserted. Pushing the plunger distorts the elastomeric member, allowing the fast flush of fluids. Again, the valve is not suitable for precise fluid flow control between ports, and fluid remains in the valve cavity even when the valve is closed. Thus, the valve itself must be flushed out if different ports are connected to it between uses and precision of flow is limited by the amount of fluid left in the is valve cavity when the valve is closed. In a precision valve, this unswept or dead volume must be minimized.

When the influent to a device is not pressurized, a valve is sometimes needed so that the influent may be drawn into a container and then passed along to an output port. For example, U.S. Pat. No. 2,888,034 to Clegg discloses a valve assembly utilizing a high density rubber piece as a valve element. The valve assembly includes an inlet port, an outlet port, and an intermediate chamber. A piston plunger causes a vacuum condition in the intermediate chamber, and the valve element allows fluid to flow from the inlet port into the intermediate chamber. The piston plunger then applies a pressure stroke and the valve allows fluid in the intermediate chamber to flow to the outlet port. Precision control of fluid flow from inlet port to outlet port is not provided by this two stroke valve.

In some applications, however, precise control of the flow of a pressurized fluid from an input port to an output port is necessary. For example, in chemical applications, minute quantities of particular fluids are frequently needed in forming compounds. In other cases, while the quantity required is not minute, the quantity that is provided must be precisely dispensed. In pharmaceutical applications, drug manufacturers require precise control of the volume of components making up the drug. In other medical applications, for example surgery, control of bodily fluid flow or of anesthetics is critical. Precise control of fluid flow rates is desirable in agricultural, aerospace, and other commercial applications as well.

Other known valves also use elastomer members. For example, U.S. Pat. No. 3,548,878 to Brigandi discloses a valve assembly utilizing a bellows type expansion plug formed out of a resilient material such as rubber. The pleats of the bellows provide resilient sealing points along the internal walls of the valve housing when the bellows is compressed. When a plunger causes the bellows to expand, fluid is allowed through the valve from an inlet port to an outlet port. A clear path is never made for fluid flow; fluid pressure must overcome the sealing force of the pleats for the fluid to flow. As the bellows expands, the sealing force of the pleats becomes weaker and easier to overcome by the fluid force. Fluid flow therefore becomes greater as the bellows is expanded.

For truly precise control of fluid flow, however, the pressure of the influent should not be relied upon to overcome the sealing force of the valve. A clear path for the fluid should be provided when the valve is in the open position. The elastomeric qualities of the valve element should not be solely relied upon to return the valve to the closed position. Such reliance can cause the valve element to wear out prematurely, and would certainly make the element less reliable over the lifetime of the valve. Rather, the valve should be equipped with a spring which returns the valve to the closed position and which counteracts fluid pressure forces which would otherwise tend to open the valve.

Some valves are known to use springs to close the valve. For example, U.S. Pat. No. 2,095,770 to Sorensen discloses a valve assembly that utilizes a coil spring. The force of the spring must be overcome in order to open the valve. However, the spring is the valve element itself; it is not used to return an elastomeric valve element.

SUMMARY OF THE INVENTION

It is therefore an object of the present invention to provide a valve that can be used to precisely control the flow rate of a fluid passing from an inlet port to an outlet port.

It is a further object of the present invention to provide a valve that completely prevents the flow of fluid from the input port to the output port when he valve is in a closed position.

It is another object of the present invention to provide a valve that does not allow any residual fluid to remain in the flow path when the valve is in a closed position, that is, allows only minimum unswept or dead volume.

It is also an object of the present invention to provide a valve that is able to reliably seal with a minimum amount of pumping when activated and deactivated.

These and other objects and advantages of the present invention will be apparent to persons of skill in the art upon inspection of the specification, drawing figures, and appended claims.

The present invention achieves precise control of fluid flow rates through the use of a cylindrical elastomeric valve element. This elastomer element is installed within the cylindrical flow path of a valve body. The flow path has a diameter that is slightly smaller than that of the elastomer element, which is therefore constrained within the flow path. Longitudinal stretching of the elastomer element causes the diameter of the elastomer element to decrease. As a result, a flow path is opened. The further the elastomer element is stretched, the larger is the fluid path that is created. Therefore, precise control of the fluid flow rate is made possible.

DETAILED DESCRIPTION

Figure 1:
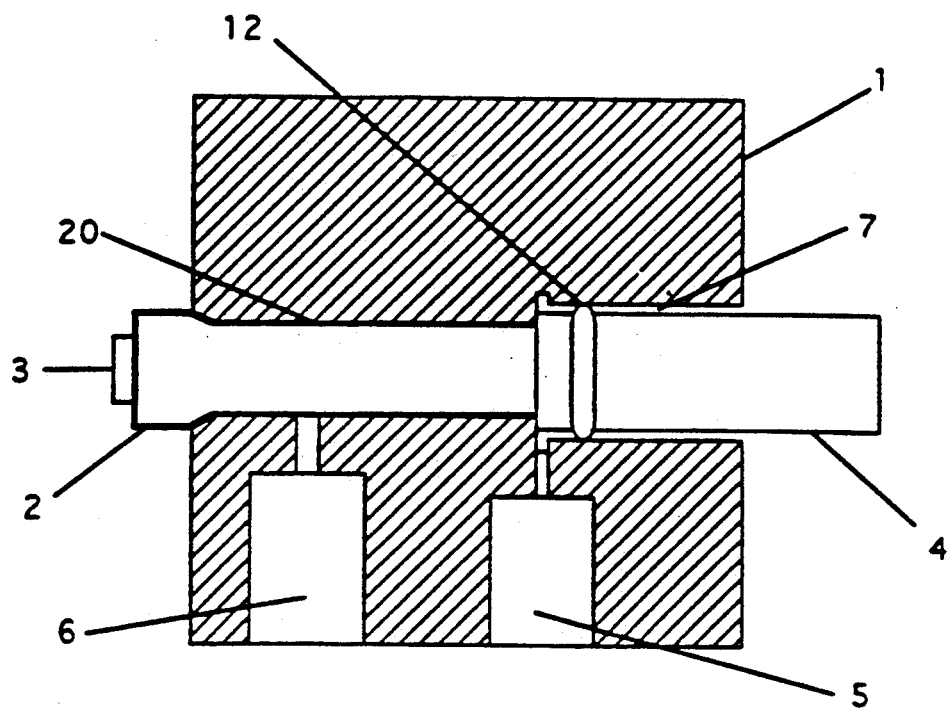
FIG. 1 is a cut-away view of the valve in the closed position.

FIG. 1 shows a cut-away view of the valve of the present invention. Valve body 1 is the main housing for the valve. It has an inlet port 5 and an outlet port 6 connected by and in communication with a bore 20 in the valve body 1. The valve body 1 supports fluids under pressure or vacuum which are to be passed from the inlet port 5 to the outlet port 6. It is shaped specifically to allow the notion of the other mechanical components of the valve.

An elastomer body, the cylindrical elastomer 2, is the active seal component of the valve. The cylindrical elastomer 2 is placed within the bore 20 such that it protrudes from the distal end of the bore 20. The cylindrical elastomer 2 is then secured at the distal end, preferably by a distal elastomer retainer barb 3. A pull handle 4, having a cylindrical diameter larger than that of the cylindrical elastomer 2, is attached to the cylindrical elastomer 2 at its proximate end. The diameter of the cylindrical elastomer 2 is slightly larger than that of the bore 20, thereby creating a fluid tight seal when compressed and placed within the bore 20. The fluid tight seal prevents any fluid leakage from the inlet port 5 to the outlet port 6 when the valve is closed, and completely evacuates the bore 20 of fluid when the valve moves from the open position to the closed position. When the distal elastomer retainer barb 3 is inserted into the distal end of cylindrical elastomer 2, the elastomer diameter is stretched so that even when compressed it is greater than the diameter of the bore 20. Thus, if the pull handle 4 is pulled, the cylindrical elastomer 2 remains secure at the distal end. The distal elastomer retainer barb 3 also seals the bore 20 at the distal end, preventing any gasses or other fluids from entering or leaving the bore 20 at this end. The pull handle cylinder 7 is a section at the proximal end of the bore 20 having a larger diameter to accommodate the pull handle 4. A pull handle O-ring 12 seals any space between the valve body and the pull handle to prevent all fluids and gasses from escaping or entering the fluid passage.

Figure 2:
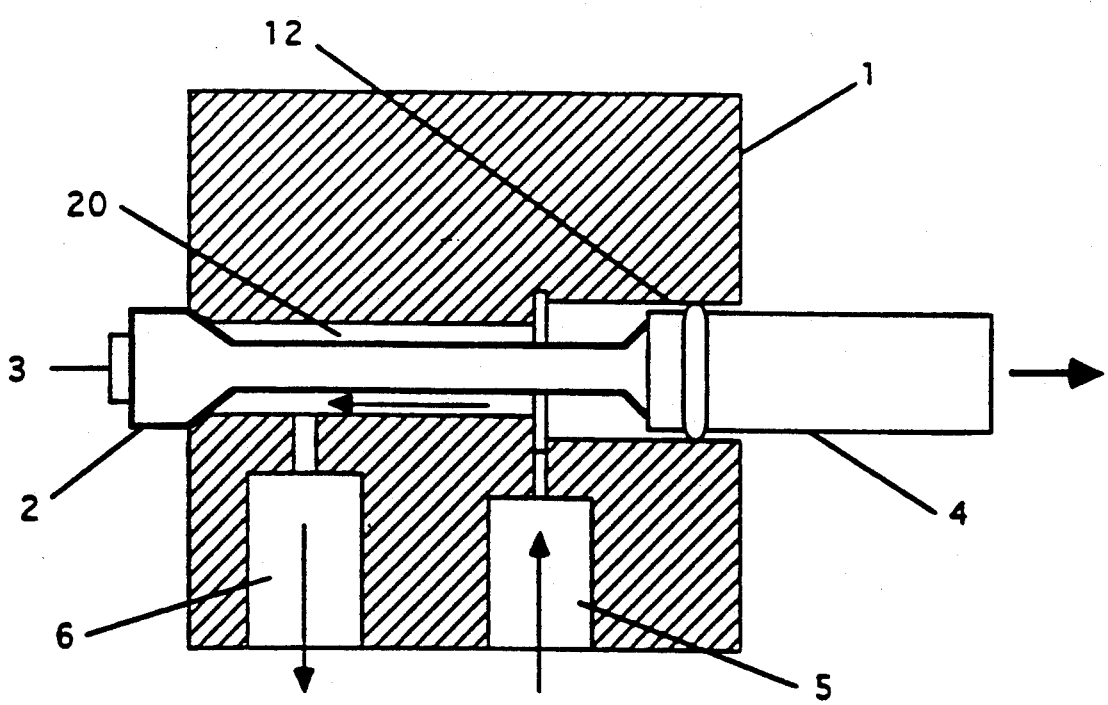
FIG. 2 is a cut-away view of the valve in the open position.

FIG. 1 shows the valve in the closed position. It is closed because the cylindrical elastomer 2 seals off the bore 20 between the inlet port 5 and the outlet port 6, preventing fluid flow between them. When the pull handle 4 is pulled, as shown in FIG. 2, the cylindrical elastomer 2 stretches. Secured at the distal end by the distal elastomer retainer barb 3 and pulled at the proximal end by the pull handle 4, the cylindrical elastomer 2 stretches and its diameter decreases. When the diameter decreases, a fluid flow path is created between the inlet port 5 and the outlet port 6 along the length of the cylindrical elastomer 2. As the pull handle 4 is pulled a greater distance, the cylindrical elastomer 2 is stretched further and its diameter further decreases accordingly. As the diameter decreases, a larger fluid flow path is created, and therefore the fluid flow rate from the inlet port 5 to the outlet port 6 increases. Thus, the fluid flow rate can be precisely controlled using the valve of the present invention by regulating the distance that the pull handle 4 is pulled. The pull handle 4 may be connected to a mechanical device which causes the pull handle 4 to be pulled particular precise distances, depending on the application with which the valve is used.

FIGS. 1 and 2 show the inlet and outlet ports 5 and 6 positioned in a parallel relationship to one another within the valve body 1. In this preferred embodiment, the fluid flow path between the ports is created along the length of the cylindrical elastomer 2. However, the ports can be positioned within the valve body 1 such that they are facing each other across the cylindrical elastomer 2. In this case, the fluid flow path created by the valve would occur around the circumference of the cylindrical elastomer 2. As the pull handle 4 is pulled and the diameter of cylindrical elastomer 2 decreases, the circumference of cylindrical elastomer 2 decreases proportionately. Thus, the fluid flow rate can be regulated just as well with the inlet and outlet ports 5 and 6 in this configuration as it can in the configuration shown in FIGS. 1 and 2. In fact, the present invention will work if the ports are oriented anywhere in the valve body 1 along the unstretched length of cylindrical elastomer 2. When the pull handle 4 is pulled, a fluid flow path will be created along the length and circumference of cylindrical elastomer 2, and the fluid or gas will flow from the inlet port 5 to the outlet port 6.

Figure 3:
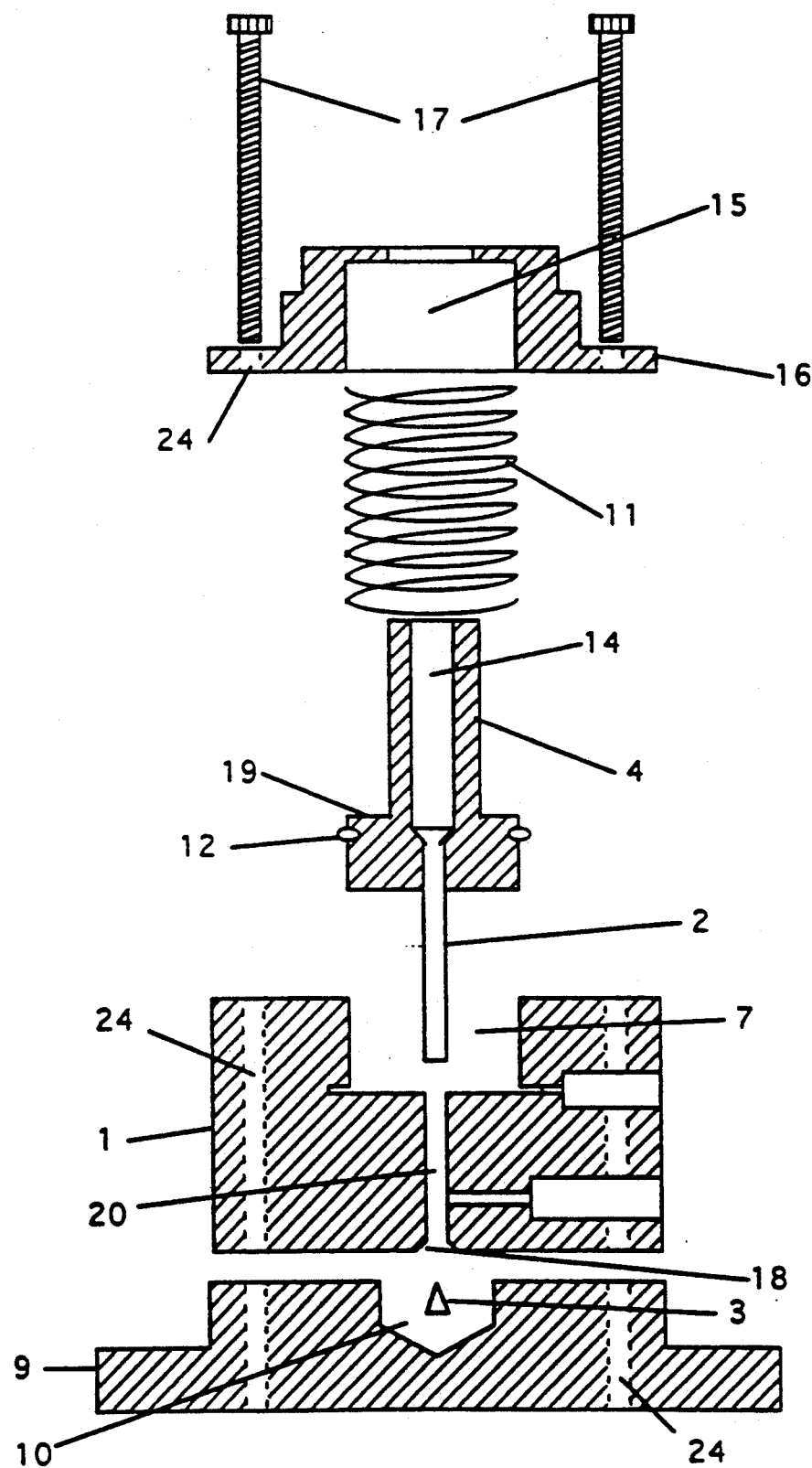
FIG. 3 is a cut-away exploded view of the complete valve assembly.

FIG. 3 shows the complete valve assembly. As in FIGS. 1 and 2, the cylindrical elastomer 2 is shown attached to the pull handle 4 and is ready to be inserted into the valve body 1. The distal elastomer retainer barb 3 is shown positioned at the distal end of bore 20. This will be used to retain the cylindrical elastomer 2 at the distal end once it is inserted into the valve body 1. The valve body 1 as shown in this figure has a chamfer 18 at the distal end of the bore 20. The chamfer 18 is present in the preferred embodiment to prevent chafing to the cylindrical elastomer 2 where it is pinched between the valve body 1 and the distal elastomer retainer barb 3. The bevel angle of the chamfer 18 may vary, but is preferably about 60 degrees from a line normal to the longitudinal axis of the bore 20.

Figure 4:
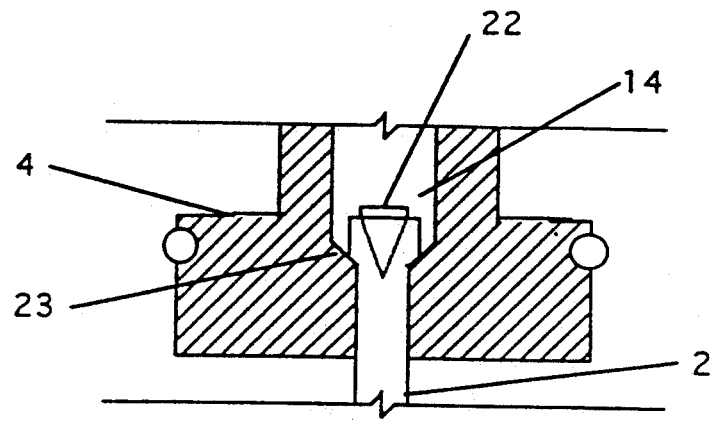
FIG. 4 is a detail cut-away view of the elastomer/pull handle junction.

FIG. 4 shows the connection of the cylindrical elastomer 2 and the pull handle 4 in more detail. The pull handle 4 is basically cylindrical in shape and has an outside diameter that is larger than that of the cylindrical elastomer 2. The pull handle 4 has a hollow channel along its longitudinal axis, the pull handle counterbore 14. The diameter of the pull handle counterbore 14 at the fixed end of the pull handle 4 is slightly larger than that of the cylindrical elastomer 2. The proximal end of the cylindrical elastomer 2 is placed partially inside the pull handle counterbore 14. The proximal elastomer retainer barb 22 is inserted into the proximal end of the cylindrical elastomer 2 to hold the cylindrical elastomer 2 in place and to prevent fluid from entering or leaving the bore 20 through the pull handle counterbore 14. The pull handle counterbore 14 fans outward at pull handle chamfer 23. As with the chamfer 18, the pull handle chamfer 23 is present in the preferred embodiment to prevent chafing to the cylindrical elastomer 2 where it is pinched between the pull handle 4 and the proximal elastomer retainer barb 22. The bevel angle of the pull handle chamfer 23 may vary, but is preferably about 60 degrees from a line normal to the longitudinal axis of the pull handle counterbore 14.

Beyond the point at which the pull handle chamfer 23 fans outward within the pull handle counterbore 14, the diameter of the pull handle counterbore 14 becomes a uniform larger size, in order to accommodate the proximal elastomer retainer barb 22. Therefore, for assembly of the valve, the proximal elastomer retainer barb 22 is first inserted into the proximal end of the cylindrical elastomer 2. The distal end of the cylindrical elastomer 2 is then inserted into the free end of the pull handle counterbore 14, and the cylindrical elastomer 2 slides through the pull handle counterbore toward the fixed end of the pull handle 4 until the proximal elastomer retainer barb 22 causes the cylindrical elastomer 2 to catch at the pull handle chamfer 23.

Now that the cylindrical elastomer 2 is secured to the pull handle 4, the pull handle 4 and the cylindrical elastomer 2 are inserted into the valve body 1. The proximal end of the bore 20 has a diameter that is larger than the diameter at the distal end in order to accommodate the pull handle 4. This section of the bore 20 is the pull handle cylinder 7. The pull handle is adapted around the outside of its distal end with a sealing means, preferably a pull handle O-ring 12, to create a fluid tight seal between the pull handle 4 and the valve body 1. The pull handle O-ring 12 ensures that no fluids will escape via the interface between the pull handle 4 and the valve body 1 while the valve is in use. Once the cylindrical elastomer 2 is installed within the valve body 1, the distal elastomer retainer barb 3 is inserted into the distal end of the cylindrical elastomer 2 as previously described in order to hold the cylindrical elastomer 2 in place within the valve body 1.

Figure 5:
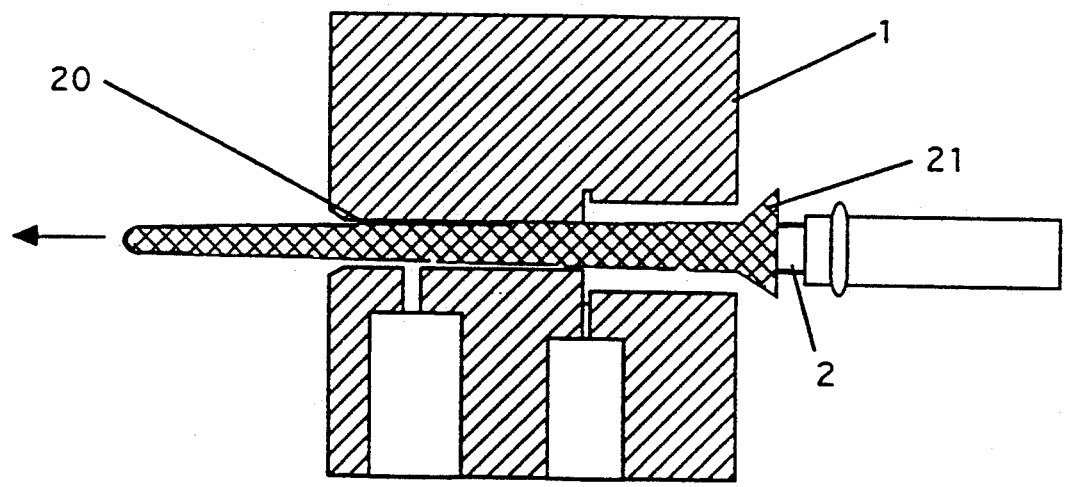
FIG. 5 shows a step in the installation of the elastomer within the valve body.

Because the diameter of the cylindrical elastomer 2 is slightly larger than that of the bore 20, a sleeve 21 is used to aid the installation. The sleeve 21 is made of braided mylar filament which is placed over the cylindrical elastomer 2 and which compresses the cylindrical elastomer 2 slightly. The sleeve 21 also offers less friction with the inside surface of the bore 20 than does the cylindrical elastomer 2, further aiding the installation. The sleeve 21 and the cylindrical elastomer 2 are pulled through the bore 20, as shown in FIG. 5. After the cylindrical elastomer 2 is fully inserted in the bore 20, the sleeve 21 is stripped off by pulling the sleeve 21 at the distal end.

Once the cylindrical elastomer 2 and the pull handle 4 are installed within the valve body 1, the base 9 and through-hole cap 16 are secured to the valve body 1. The valve body 1 rests its distal face on the base 9. The base 9 includes a counterbase 10 region which is countersunk from the face of the base 9 in order to accommodate whatever portions of the distal elastomer retainer barb 3 and cylindrical elastomer 2 extend beyond the distal face of the valve body 1. The through-hole cap 16 is placed over the free end of the pull handle 4 and rests on the proximal face of the valve body 1. The through-hole cap 16 has a cap counterbore 15 to accommodate the free end of the pull handle 4. A pull handle spring 11 is placed over the pull handle 4 and rests on a pull handle shoulder 19. The pull handle shoulder 19 is an annular portion of the pull handle 4, at the fixed end, which has an outer diameter that is larger than that at the free end, forming a shoulder which supports the pull handle spring 11. The pull handle spring 11 ensures that when the pull handle 4 is released after having been pulled, the pull handle will return to a fully retracted position, closing any fluid flow path within the valve. Because it is important to the long life and reliable operation of the cylindrical elastomer 2 that its elasticity is not completely relied upon to return the pull handle 4, use of the pull handle spring 11 in the preferred embodiment will extend the reliable life of the valve. The pull handle spring 11 also helps the cylindrical elastomer 2 to overcome any fluid pressure built up within the valve body 1 that would otherwise cause the pull handle 4 to be pushed out of the pull handle cylinder 7.

The through hole cap 16, valve body 1, and base 9 are secured together by screws 17. These screws 17 are mated to screw holes 24 that pass through the length of the through hole cap 16, valve body 1, and base 9.

Preferred and alternate embodiments of the present invention have now been described in detail. It is to be noted, however, that this description of these embodiments is merely illustrative of the principles underlying the inventive concept. It is therefore contemplated that various modifications of the disclosed embodiments will, without departing from the spirit and scope of the invention, be apparent to persons skilled in the art.

What is claimed is:

1. A stretch valve for precise control of fluid flow between an inlet port and an outlet port, comprising:
   (A) a valve body, having a distal end, a proximal end, a distal face, and a proximal face and further having a cylindrical bore spanning the valve body from the distal end of the valve body to the proximal end of the valve body, the cylindrical bore having a distal end, a proximal end, a distal portion and a proximal portion, the valve body further having an inlet port in fluid communication with the distal portion of the bore and an outlet port in fluid communication with the distal portion of the bore,,
   (B) a cylindrical elastomer, located inside the distal portion of the bore and having a distal end, a proximal end, and a diameter, the cylindrical elastomer completely filling the distal portion of the bore so as to prevent a fluid path between the inlet port and the outlet port, the distal end of the cylindrical elastomer being fixed to the distal end of the valve body at the distal end of the bore;
   (C) a cylindrical pull handle located in the proximal portion of the bore and having a fixed end, a free end, a fixed, portion, and a free portion, the fixed end being attached to the proximal end of the cylindrical elastomer;
   (D) the valve body allowing a reciprocating motion of the cylindrical pull handle such that when the pull handle is pulled from the valve body, the cylindrical elastomer stretches longitudinally, causing the diameter of the cylindrical elastomer to decrease, allowing a fluid flow path to form between the inlet port and the outlet port.

2. The stretch valve of claim 1, further comprising:
(A) a base having a first plurality of threaded screw holes;
(B) a through-hole cap having a second plurality of threaded screw holes; and
(C) a plurality of screws;
(D) the valve body further having a third plurality of threaded screw holes;
(E) the distal face of the valve body in contact with the base such that the first plurality of threaded screw holes aligns with the third plurality of threaded screw holes;
(F) the through-hole cap in contact with the proximal face of the valve body such that the second plurality of threaded screw holes aligns with the third plurality of threaded screw holes; and
(G) the plurality of screws threading through the first plurality of threaded screw holes, the second plurality of threaded screw holes, and the third plurality of threaded screw holes such that the base, the valve body, and the through-hole cap are connected.

3. The stretch valve of claim 2, wherein:
(A) the pull handle has a pull handle shoulder where the free portion of the pull handle meets the fixed portion of the pull handle; and
(B) the stretch valve further comprises a pull handle spring which slides over the free portion of the pull handle and rests on the pull handle shoulder, acting to push the fixed end of the pull handle toward the distal portion of the bore.

4. The stretch valve of claim 1, wherein the cylindrical pull handle further comprises a sealing means for providing a fluid tight seal between the cylindrical pull handle and the bore.

5. A method of precisely controlling a fluid flow between an inlet port and an outlet port connected by a hollow passage, comprising the steps of:
A) filling the passage with an elastomer body so as to prevent fluid flow between the inlet port and the outlet port, the elastomer body having a first end, a second end, and a diameter;
B) fixing the first end of the elastomer body so that the first end of the elastomer body will not move with respect to the passage;
C) pulling the second end of the elastomer body away from the passage to a precise extent, causing the elastomer body to stretch and causing the diameter of the elastomer body to decrease in size, allowing fluid flow between the input port and the output port, the rate of fluid flow being dependent on the extent of the pulling of the second end of the elastomer body.

6. A stretch valve for precise control of fluid flow between an inlet port and an outlet port, comprising:
(A) a valve body, having a distal end, a proximal end, a distal face, and a proximal face and further having a cylindrical bore spanning the valve body from the distal end of the valve body to the proximal end of the valve body, the cylindrical bore having a distal end, a proximal end, a distal portion and a proximal portion, the valve body further having an inlet port in fluid communication with the distal portion of the bore and an outlet port in fluid communication with the distal portion of the bore, the distal portion of the bore having a first cylindrical diameter and the proximal portion of the bore having a second cylindrical diameter, the first cylindrical diameter being smaller than the second cylindrical diameter, forming an annular ridge between the distal portion of the bore and the proximal portion of the bore;
(B) a cylindrical elastomer, located inside the distal portion of the bore and having a distal end, a proximal end, and a diameter, the cylindrical elastomer completely filling the distal portion of the bore and protruding from the distal end of the bore so as to prevent a fluid path between the inlet port and the outlet port, the cylindrical elastomer having a first retainer barb inserted in the distal end of the cylindrical elastomer so as to hold the distal end of the cylindrical elastomer in place;
(C) a cylindrical pull handle located in the proximal portion of the bore and having a fixed end, a free end, a fixed portion, and a free portion, the fixed end being attached to the proximal end of the cylindrical elastomer such that the fixed end of the cylindrical pull handle rests on the ridge, the cylindrical pull handle further comprising a sealing means for providing a fluid tight seal between the cylindrical pull handle and the bore;
(D) the valve body allowing a reciprocating notion of the cylindrical pull handle such that when the pull handle is pulled from the ridge, the cylindrical elastomer stretches longitudinally, causing the diameter of the cylindrical elastomer to decrease, allowing a fluid flow path to form between the inlet port and the outlet port.

7. The stretch valve of claim 6, wherein the distal end of the bore includes a chamfer such that the diameter of the bore at the distal end of the bore is larger than the diameter of the rest of the distal portion of the bore in order to accommodate the first retainer barb and the distal end of the cylindrical elastomer.

8. The stretch valve of claim 6 further comprising:
(A) a base having a counterbase region and a first plurality of threaded screw holes;
(B) a through-hole cap having a cap counterbore and a second plurality of threaded screw holes; and
(C) a plurality of screws;
(D) the valve body further having a third plurality of threaded screw holes;
(E) the distal face of the valve body in contact with the base such that the first plurality of threaded screw holes aligns with the third plurality of threaded screw holes and the counterbase region accommodates the first retainer barb and the distal end of the cylindrical elastomer;
(F) the through-hole cap in contact with the proximal face of the valve body such that the second plurality of threaded screw holes aligns with the third plurality of threaded screw holes and the cap counterbore accommodates the free end of the pull handle; and
(G) the plurality of screws threading through the first plurality of threaded screw holes, the second plurality of threaded screw holes, and the third plurality of threaded screw holes such that the base, the valve body, and the through-hole cap are connected.

9. The stretch valve of claim 8, wherein:
(A) the free portion of the pull handle has a first outer diameter and the fixed portion of the pull handle has a second outer diameter, the first outer diameter being smaller than the second outer diameter, forming a pull handle shoulder where the free portion of the pull handle meets the fixed portion of the pull handle; and (B) the stretch valve further comprises a pull handle spring which slides over the free portion of the pull handle and rests on the pull handle shoulder, acting to push the fixed end of the pull handle against the annular ridge between the distal portion of the bore and the proximal portion of the bore.

10. The stretch valve of claim 6 wherein the pull handle further comprises a pull handle counterbore within the pull handle and running along the longitudinal axis of the pull handle, the pull handle counterbore having a free portion and a fixed portion, the free portion having a first diameter and the fixed portion having a second diameter, the first diameter being larger than the second diameter, forming a counterbore shoulder.

11. The stretch valve of claim 10 further comprising:

(A) a second retainer barb, the second retainer barb being smaller than the first diameter of the pull handle counterbore, the second retainer barb further being larger than the second diameter of the pull handle counterbore;

(B) the second retainer barb being inserted into the proximal end of the cylindrical elastomer;

(C) the cylindrical elastomer being inserted into the pull handle counterbore such that the proximal end of the cylindrical elastomer becomes wedged at the counterbore shoulder and the distal end of the cylindrical elastomer protrudes from the fixed end of the pull handle.

12. The stretch valve of claim 11, wherein the counterbore shoulder is a second chamfer, the second chamfer causing a gradual decrease in size from the first pull handle counterbore diameter to the second pull handle counterbore diameter.

13. The stretch valve of claim 6, wherein the sealing means is an O-ring seal.

* * * * *